United States Patent
Langdon

Patent Number: 6,095,433
Date of Patent: Aug. 1, 2000

[54] IRRIGATION SYSTEM AND METHOD OF PERFORMING SAME

[75] Inventor: Peter Joseph Langdon, Aylesbury, United Kingdom

[73] Assignee: Langdon (London) Limited, United Kingdom

[21] Appl. No.: 08/919,467

[22] Filed: Aug. 28, 1997

[51] Int. Cl.⁷ .................................................. B05B 15/00
[52] U.S. Cl. ......................... 239/272; 239/271; 239/542; 239/569; 239/581.1; 222/81; 222/89; 222/90; 222/553
[58] Field of Search .................................. 239/271, 272, 239/542, 569, 581.1; 222/89, 90, 553, 81

[56] References Cited

U.S. PATENT DOCUMENTS

| | | | |
|---|---|---|---|
| 549,305 | 11/1895 | Barnes | 222/90 |
| 674,343 | 5/1901 | Oakes | 239/271 |
| 766,083 | 7/1904 | Watts | 222/90 |
| 1,911,076 | 5/1933 | Gandola | 222/90 |
| 1,979,337 | 11/1934 | Matthiessen, Jr. | 222/90 |
| 3,792,799 | 2/1974 | Henfrey | 222/81 |
| 4,141,477 | 2/1979 | Hengesbach | 239/542 X |
| 4,543,990 | 10/1985 | Meuleman | 239/272 X |
| 4,881,662 | 11/1989 | Tallman | 222/89 X |

Primary Examiner—Andres Kashnikow
Assistant Examiner—Robin O. Evans
Attorney, Agent, or Firm—Galgano and Burke

[57] ABSTRACT

An irrigation system comprising a container for holding a liquid, a tap, a device for simultaneously puncturing the container and securing the tap to the container and a device for regulating the dispersement of the liquid from the container. Also provided is a method of irrigation comprising the steps of attaching at least a portion of a spike to a tap thus forming a tap and spike assembly, puncturing a container for holding a liquid with the tap and spike assembly and simultaneously securing the tap to the container wherein the spike automatically dislodges from the tap and falls into the container, and dispersing the liquid from the container to a desired irrigation area.

11 Claims, 3 Drawing Sheets

IRRIGATION SYSTEM AND METHOD OF PERFORMING SAME

The present invention relates to a system for watering plants and vegetation growing in flower pots and/or flower gardens. More particularly, the present invention relates to an irrigation system for nourishing plants and vegetation with a regulated supply of water and/or other liquid nutrients.

BACKGROUND

In order to maintain healthy plants and/or a healthy garden it is essential that the plants and/or vegetation receive a steady and regulated supply of water and/or other nutrients. For example, it is well known in the horticulture industry that an inadequate supply of water and other nutrients will often cause plants to become weak and malnourished and, in extreme cases, may lead to plant death. It is also well known that an oversupply of water and other nutrients can also attribute to plant death and/or plant disease.

Thus, it is essential that a proper and regulated amount of water and nutrients be supplied to a plant in order to assure healthy and succulent plant growth.

Several devices have been introduced in the past which control the amount of water and other nutrients supplied to plants and other vegetation. For example, it is known in the art to irrigate plants and vegetation utilizing one or in some cases a series of perforated pipes, capillary elements and/or automatic sprinkling systems. By and large, these systems involve relatively expensive piping, complex timing systems and installation and maintenance charges. Moreover, in some cases, these systems simply wet the plant itself rather than the ground surface and/or the plant's root system. Further, many of these systems are impractical especially for watering household potted plants and/or small gardens which generally only require regulated manual watering in order to assure healthy plant growth.

It would therefore be desirable to provide a simple, yet effective, automatic irrigation system which solves many of the problems noted above.

SUMMARY OF THE INVENTION

While apparently generally acceptable for their intended purposes, so far as is known, none of the prior art devices afford an irrigation system which comprises a container for holding a liquid, a tap, a device for simultaneously puncturing the container and securing the tap to the container and a device for regulating the dispersement of the liquid from the container.

Accordingly, it is an object of the present invention to provide an irrigation system which is economical to manufacture, durable and of relatively simple construction and design.

It is another object of the present invention to provide an irrigation system which is simple to use and is inexpensive.

More particularly, it is an object the present invention to provide an irrigation system which regulates the amount of water or other plant nutrients supplied to plants and vegetation.

Still another object of the present invention is to provide a system which regulates the amount of water in small constant amounts over a prolonged period of time, e.g., in a drip-like manner, which will keep plants and other vegetation well nourished during periods of prolonged absences, e.g, holidays and vacation.

It is another aspect of the present invention to provide an irrigation system which can automatically and effectively irrigate potted plants and small gardens over a prolonged period of time without manual intervention.

Still another object of the present invention to provide an irrigation system which is interchangeable with different watering containers and is reusable.

Yet still another object of the present invention is to provide an irrigation system which can automatically and effectively irrigate a plant's root system over a prolonged period of time without manual intervention.

It is another object of the present invention to provide a method of irrigating plants and vegetation comprising the steps of a) attaching at least a portion of a spike to a tap thus forming a tap and spike assembly; b) puncturing a container for holding a liquid with the tap and spike assembly and simultaneously securing the tap to the container wherein the spike automatically dislodges from the tap and falls into the container; and c) dispersing the liquid from the container to a desired irrigation area. another object of the present invention is to provide a method as described above which includes the additional step of regulating the liquid as it is dispersed from the container.

These and other aspects of the present invention are described in greater detail below.

BRIEF DESCRIPTION OF THE DRAWINGS

In the drawings, wherein similar reference characters denote similar elements throughout the several views.

DETAILED DESCRIPTION

Figure 1:
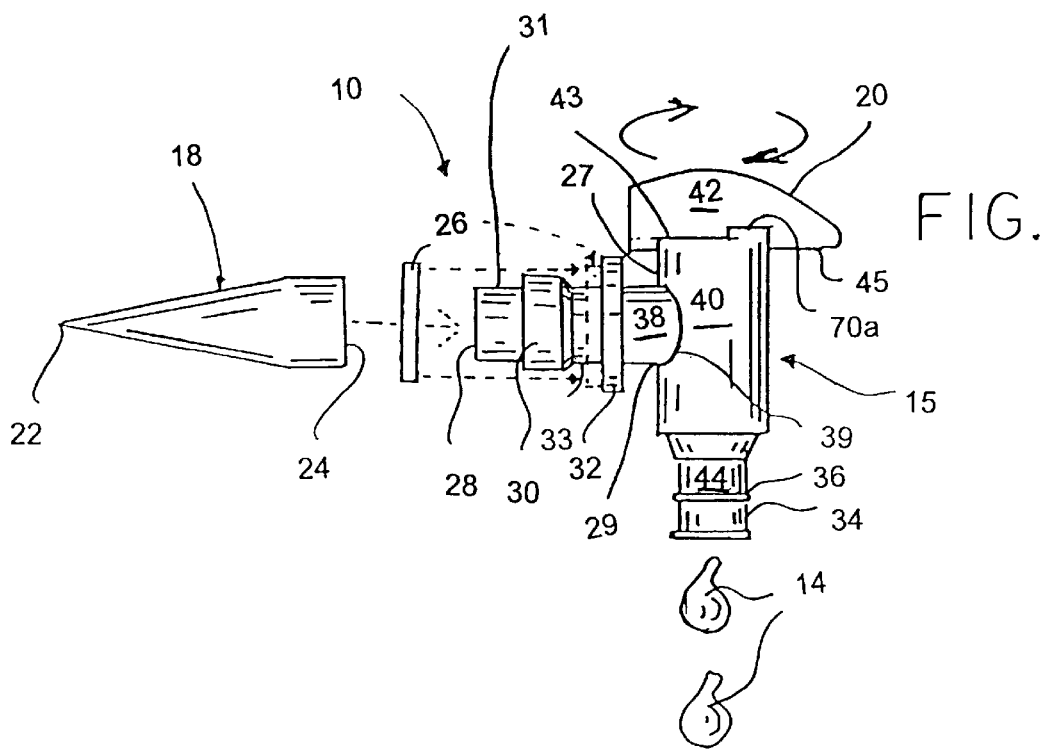
FIG. 1 is an exploded side view of the present invention showing the positioning of the spike and O-ring on the tap.

One embodiment the present invention shown in FIG. 1 comprises, an irrigation system 10 comprising a container 12 for holding a liquid 14, a tap 15, a spike 18 for puncturing the container 12 and an O-ring 26 for securing the tap 15 to the container 12 and a device 20 for regulating the dispersement of the liquid 14 from the container 12. Preferably, an empty plastic container, e.g., a plastic milk bottle, is utilized as the container 12 for holding liquid 14. As can be appreciated, this provides two distinct advantages: 1) the liquid 14 or water used for the container can come from a local reservoir or household faucet which is very inexpensive; and 2) the plastic bottle is reusable and does not get discarded which is environmentally friendly and cost free.

The regulating device or first hollow portion 20 and a second hollow portion 41 (See FIG. 5) when combined form tap 15. In one embodiment, the first hollow portion 20 comprises a turning tab 42 located at one end and a nozzle 44 located at an opposite end. Preferably, at least one aperture 72 is located between the turning tab 42 and the nozzle 44.

Figure 5:
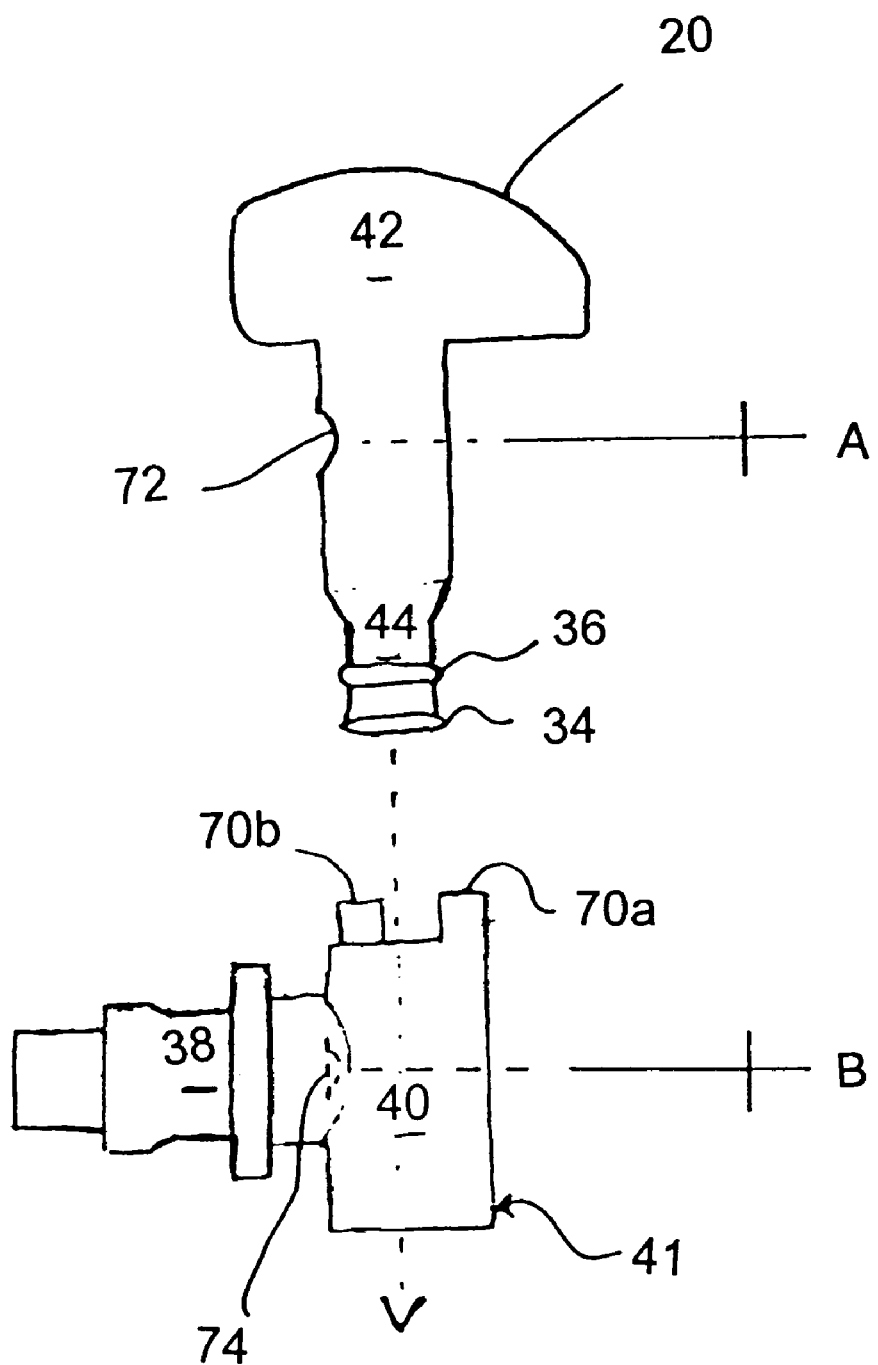
FIG. 5 is an exploded side view of the tap showing a first hollow portion and a second hollow portion and the preferred location of the apertures with respect to each of the same.

In the embodiment shown in FIGS. 1 and 5, the second hollow portion 41 is generally T-shaped and comprises a short hollow leg 40 and a long hollow leg 38. Preferably, an outer end 29 of the long hollow leg 38 and a sidewall 27 of the short hollow leg 40 are integrally joined at junction 39 such that the long leg 38 is oriented generally perpendicular to the short leg 40 and an aperture 74 is formed between the two legs 38, 40.

Also shown in FIGS. 1 and 5, short leg 40 comprises a pair of opposing upwardly extending flanges 70a and 70b along the upper end 43 thereof. Nozzle portion 44 of the first hollow portion 20 is rotatably receivable within short hollow leg 40 up to a point where the bottom edge 45 of turning tab 42 prevents turning tab 42 from entering short hollow leg 40. Preferably, nozzle portion 44 is received within short leg 40 in a close-fit or friction-fit manner so as to minimize leakage of liquid 14 when system 10 is operating.

As shown best in FIG. 1, when the two hollow portions 20 and 41 are assembled wherein nozzle 44 is fully received within short leg 40, aperture 72 is generally aligned with aperture 74 and the bottom edge 45 of tab 42 abuts against the upper end 43 of short leg 40 between opposing flanges 70a and 70b. As can be appreciated, because tab 42 is positioned between opposing flanges 70a and 70b, the turning movement of tab 42 is restricted, e.g., tab 42 is rotatable between a first position where apertures 72 and 74 are fully aligned and liquid 14 flows freely therethrough and at least one additional position where the apertures 72 and 74 are generally misaligned retarding the flow of liquid 14 through tap 15. This allows a user to selectively regulate the amount of liquid 14 flowing from container 12 during operation of the irrigation system 10 and also allows a user to selectively shut off the liquid 14 flow from container 12 when desired. In one particular embodiment, the liquid 14 is regulated through tap 15 in small steady amounts or in a drip-like manner. As can be appreciated, this allows a plant owner to irrigate plants during periods of prolonged absence, e.g., holidays and/or vacations. For example, it has been shown that a container 12 which holds three (3) liters of liquid 14 can effectively irrigate a plant for approximately three (3) weeks when the irrigation system 10 is regulated to disperse liquid 14 in a drip-like manner.

Preferably, long hollow leg 38 comprises a first end 28 and a second end 29 wherein second end 29 is integrally joined to short leg 40 at junction 39 forming aperture 74 therebetween. Long leg 38 also comprises a first annular retaining ring 30 and a second annular retaining ring 32. Ring 30 is disposed in general proximity to end 28 leaving a first section 31 of hollow leg 38 exposed. Ring 32 is disposed inwardly thereof towards and in general proximity of end 29 exposing a second section 33 of hollow leg 38 which is located between ring 30 and ring 32.

As shown in FIG. 1, a resilient O-ring or gasket 26 is selectively engageable with long leg 38. As can be appreciated from the present disclosure and as explained in further detail below, the O-ring 26 performs a dual role for the irrigation system 10: 1) the resilient characteristics of the O-ring help to seal the tap 15 to container 12 and prevent leakage of liquid 14 from container 12; and 2) the O-ring helps to secure tap 15 to container 12.

Advantageously, the diameter of section 31 is smaller than the inner diameter of O-ring 26 to facilitate the positioning of the O-ring 26 over the same between ring 30 and ring 32. Moreover, the diameter of section 33 is slightly larger than the inner diameter of O-ring 26 such that O-ring 26 snugly encompasses this section (33). In one particular embodiment the outer diameters of both retaining rings 30 and 32 are larger than the inner diameter of O-ring 26 such that O-ring 26 will remain positioned between rings 30 and 32 when the irrigation system 10 is assembled and operating. Advantageously, ring 32 has the greater diameter than ring 30 to prevent movement of the O-ring 26 toward end 29. Preferably, ring 30 is slightly tapered in a direction towards ring 32 so as to facilitate removing O-ring 26 from section 33 during disassembly of the irrigation system 10.

FIG. 1 also shows spike 18 which comprises point 22 and hollow end 24. Preferably, the inner diameter of spike 18 at hollow end 24 is slightly larger than the outer diameter of section 31 such that when spike 18 is assembled with tap 15, end 24 encompasses end 28 in a loose-fitting manner thus enabling spike 18 to become easily dislodged from tap 15 once container 12 is punctured in the manner described below. Advantageously, the outer diameter of spike 18 at end 24 is also equivalent to the outer diameter of ring 30 such that when spike 18 is assembled with tap 15 as described above (i.e., end 24 encompasses end 28) end 24 abuts against ring 30 in a flush manner.

Once the tap 15, O-ring 26 and spike 18 are assembled in the manner described above to form a tap and spike assembly, a container 12 for holding a liquid 14 is then positioned so that it can be easily punctured. Preferably, container 12 is positioned in such a manner that liquid 14 will not readily disperse through the container 12 during the puncturing process, e.g., on its side as shown in FIG. 2.

Figure 2:
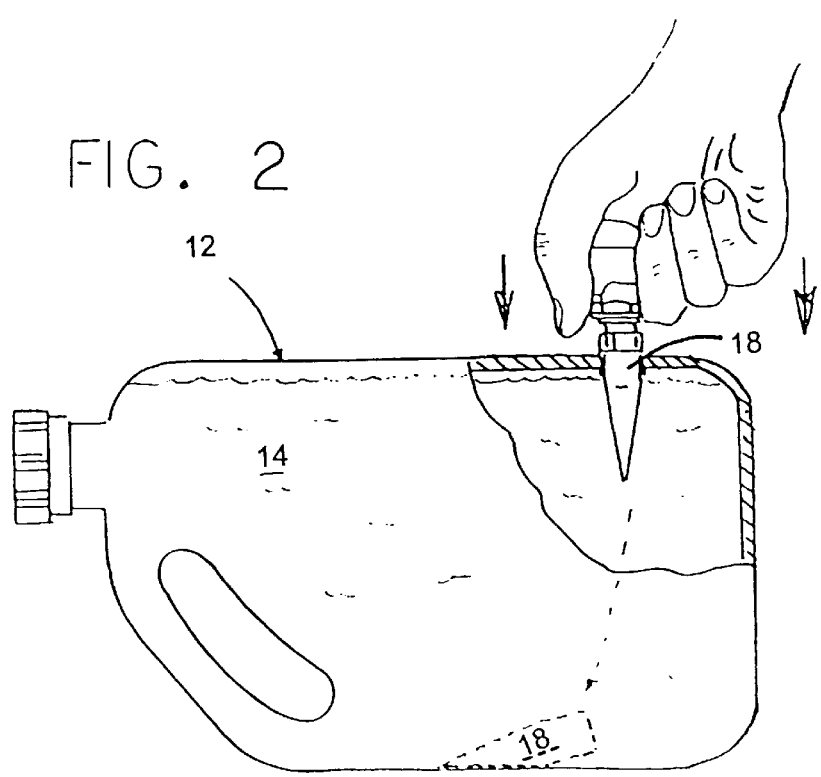
FIG. 2 is a side view the present invention a spike puncturing a container with the resting position of the spike after insertion shown in phantom.

In the embodiment shown in FIG. 2, the point 22 of spike 18 of the tap and spike assembly is forced through container 12 forming an aperture (not shown) in one side thereof. As can be appreciated from the present disclosure, since spike 18 is preferably conically dimensioned the size of the aperture (not shown) in the side of the container 12 will increase as the spike 18 is continually forced through the container 12 and will eventually obtain a diameter of approximately the same size as the end 24 of spike 18. As mentioned above, since the outer diameter of end 24 and the outer diameter of ring 30 are equivalent and flush when assembled, as the spike 18 is continually force through the container the edge of the aperture of the container (not shown) will eventually be forced over ring 30 into section 33 to abut against O-ring 26 which will both seal and secure the tap 15 in place against container 12. As can be appreciated from the present disclosure, the tap 15, O-ring 26 and spike 18, when assembled, cooperate in such a manner that container 12 is punctured and the tap 15 is secured and sealed to the container 12 in one forceful movement and/or simultaneously.

As shown in FIG. 2, since spike 18 is only loosely fitted over end 28, once the edge of the aperture of the container 12 passes over end 24 of spike 18, spike 18 will automatically dislodge from tap 15 and fall into container 12. Spike 18 can later be retrieved from container 12 after irrigation is complete.

Figure 3:
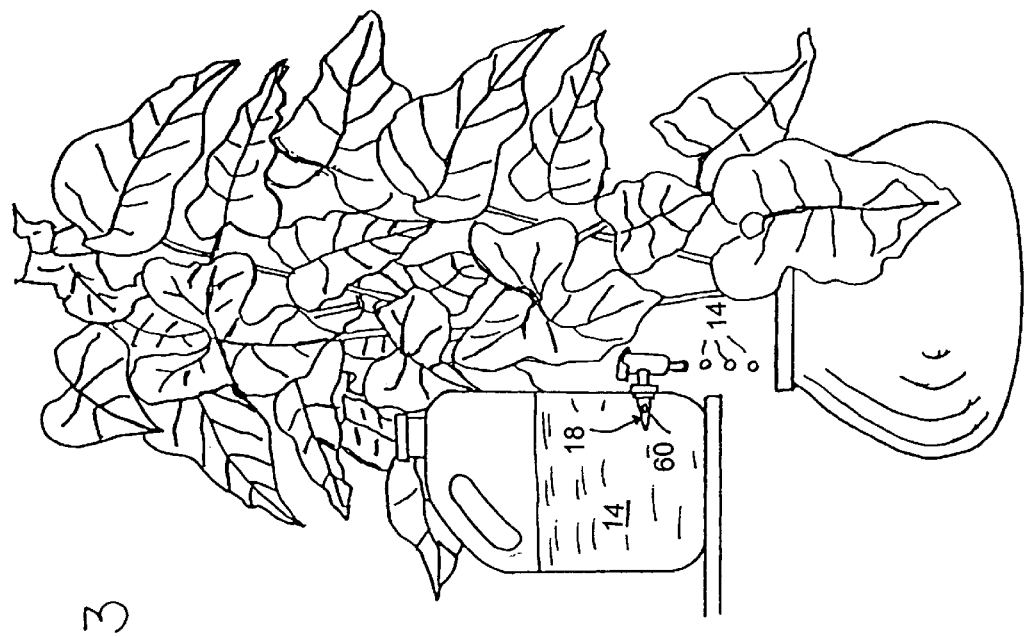
FIG. 3 is a side view of the present invention shown irrigating a potted plant.

FIG. 3 shows another embodiment of the irrigation system 10 wherein a tube 46 is connected to the open end of nozzle 44. Preferably, one end 54 of tube 46 is frictionally secured to nozzle 44 by ridges 36 and 34 located about the outer periphery of nozzle 44. As can be appreciated, other means can be employed to secure tube 46 to nozzle 44.

Figure 4:
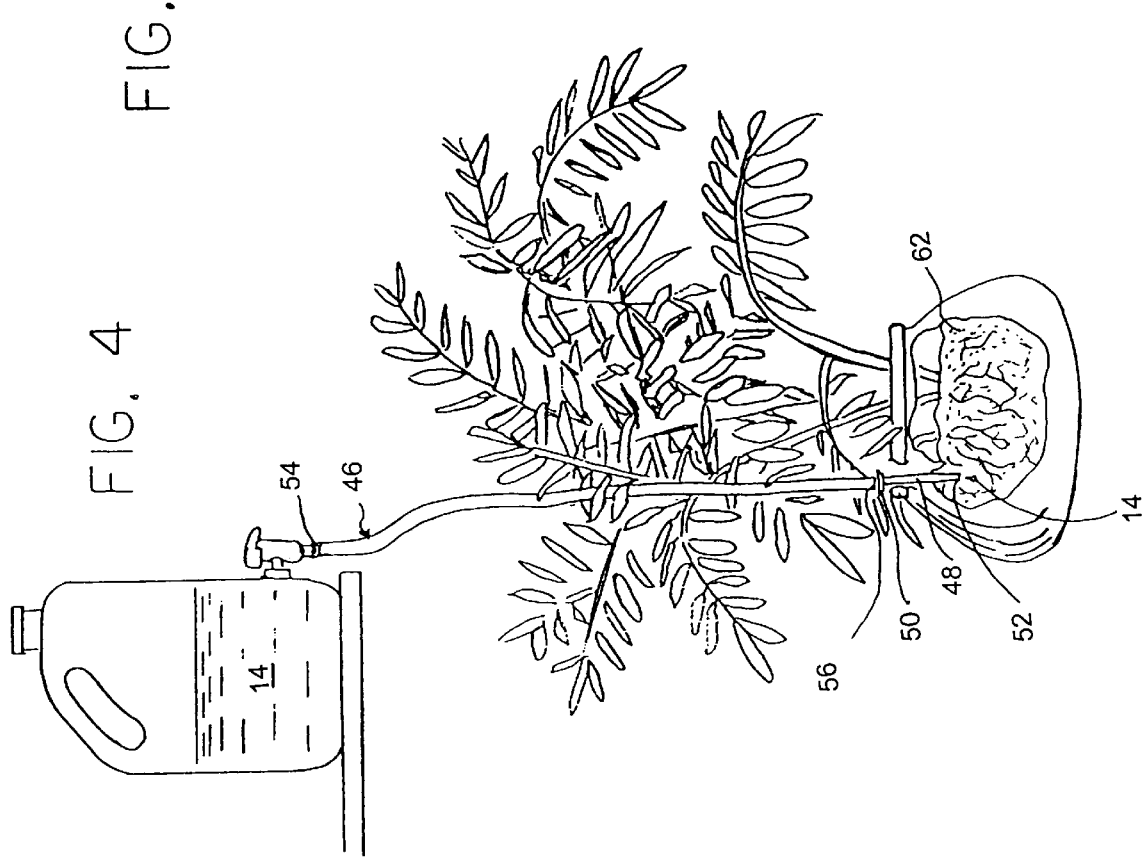
FIG. 4 is a side view of the present invention shown with an irrigation tube attached to the tap irrigating the roots of a potted plant via a hollow plant support member.

In another embodiment, a hollow plant support or plant tube 48 can be employed to direct liquid 14 into a plant growing medium or soil 62 and towards a plants root system. Hollow plant support 48 comprises a first end 50 and a second end 52. Preferably, first end 50 is tapered so as to facilitate receiving liquid 14 from container 12. Advantageously, second end 52 is also tapered to facilitate insertion into soil 62. In another embodiment, as shown in FIG. 4, the non-secured end 56 of tube 46 is placed in close proximity to end 50 of plant support 48 to assure dispersement of the liquid 14 into the plant support 48.

FIG. 3 shows another embodiment of the irrigation system 10 wherein spike 18 remains engaged to tap 15. In this embodiment, spike 18 comprises at least one aperture 60 located therein for receiving liquid 14 therethrough and directing liquid to tap 15 for dispersement.

Other embodiments of the present invention comprise a method of irrigation comprising the steps of:

a) attaching at least a portion of spike 18 to a tap 15 thus forming a tap and spike assembly;

b) puncturing container 12 with the tap and spike assembly and simultaneously securing tap 15 to container 12 wherein spike 18 automatically dislodges from tap 15 and falls into container 12; and c) dispersing liquid 14 from container 12 to a desired irrigation area.

Another embodiment comprises a method of irrigation according to the above method further comprising the step of:

d) regulating the dispersement of the liquid 14 from container 12.

Still another method comprises the method described above and the additional step of:

e) attaching first end 54 of tube 46 to nozzle 44 of tap 15 and positioning at least one second end 56 of tube 46 in close proximity to a desired irrigation area.

Yet still another method of irrigation comprises the method described above wherein second end 56 is positioned into a region of growing medium 62 occupied by a plant's roots. In another embodiment, end 56 is positioned in close proximity of end 50 of hollow plant support 48 which is, in turn, inserted into the soil 62 in close proximity of a plant's root system.

Preferably, as shown in the various figures, other embodiments of the irrigation system 10 can be designed without departing from the scope of the present invention. For example, while it is preferably that the tap 15 and the spike are manufactured from a durable plastic material, in some cases it may be desirable to utilize other materials such as metal or aluminum. In another embodiment, it may be desirable to manufacture spike 18 from a hard yet dissolvable material which contains plant nutrients, such as those nutrients commonly sold under the trademark MIRACLE-GROW®.

In other cases, it may be desirable to manufacture the tap having more than one nozzle 44 or more than one tube 46 such that more than one plant can be irrigated simultaneously.

I claim:

1. An irrigation system comprising:

a container for holding a liquid;

a tap;

means for simultaneously puncturing said container and securing said tap to said container comprising a loose fitting spike which can fall off the tap and a resilient O-ring; and said tap further comprising a first hollow portion and a second hollow portion wherein said second portion is secured to said container.

2. An irrigation system according to claim 1 further comprising:

an irrigation tube having a first end and at least one second end wherein said first end is selectively engageable with said tap and said at least one second end is selectively positionable to an area in close proximity to a desired irrigation area.

3. An irrigation system comprising:

a container for holding a liquid;

a tap;

means for simultaneously puncturing said container and securing said tap to said container comprising a loose fitting spike which can fall off the tap; and further comprising regulating means comprising a spigot valve.

4. An irrigation system according to claim 1 wherein said liquid is regulated in a drip-like manner.

5. An irrigation system according to claim 1 wherein:

said first hollow portion comprises at least one aperture located within said first hollow portion and at least a portion of said first hollow portion is rotatably receivable within at least a portion of said second hollow portion.

6. An irrigation system according to claim 5 wherein:

said second hollow portion is generally T-shaped and comprises a short hollow leg and a long hollow leg and an aperture located at the union of said legs; and said short hollow leg is sufficiently dimensioned to rotatably receive said first hollow portion such that said first portion is rotatable from a first position wherein said aperture of said first hollow portion is aligned with said aperture of said second hollow portion and at least one subsequent position wherein said aperture of said first portion is not aligned with said aperture of said second portion.

7. An irrigation system according to claims 6 wherein;

said long hollow leg comprises a first annular retaining ring and a second annular retaining ring located about the outer perimeter thereof.

8. An irrigation system according to claim 7 wherein:

said O-ring is positioned between said first annular retaining ring and said second annular retaining ring such that when said tap is secured on said container, said O-ring prevents leakage of said liquid from said container.

9. An irrigation system according to claim 7 wherein:

said spike is generally conical and comprises a spiked end and an engaging end; said engaging end comprising an outer diameter which is substantially equivalent to the outer diameter of said first annular ring such that when said container is punctured by said spike thus forming an aperture in said container having an outer edge, said outer edge of said container aperture will be forced over said spike and over said first annular ring so as to rest between said first annular ring and said second annular ring and abut against said O-ring.

10. An irrigation system according to claim 7 further comprising:

a pair of opposing projecting flanges extending from a distal end of said second portion; and a tab for rotating said first portion wherein said tab is positioned between said opposing flanges such that said tab is rotatable between said opposing flanges from a first position wherein said aperture of said first portion and said aperture of said second portion are fully aligned, and at least one other position wherein said aperture of said first portion and said aperture of said second portion are fully not aligned.

11. An irrigation system according to claim 1 wherein said spike comprises at least one aperture.

* * * * *